A. ONSLOW.
Car Axle-Box.
No. 206,603. Patented July 30, 1878.
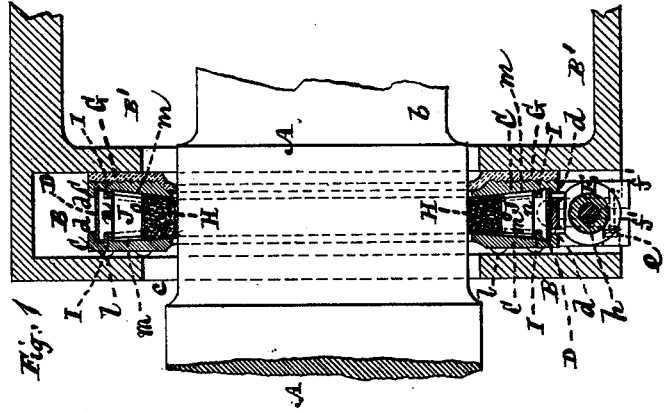
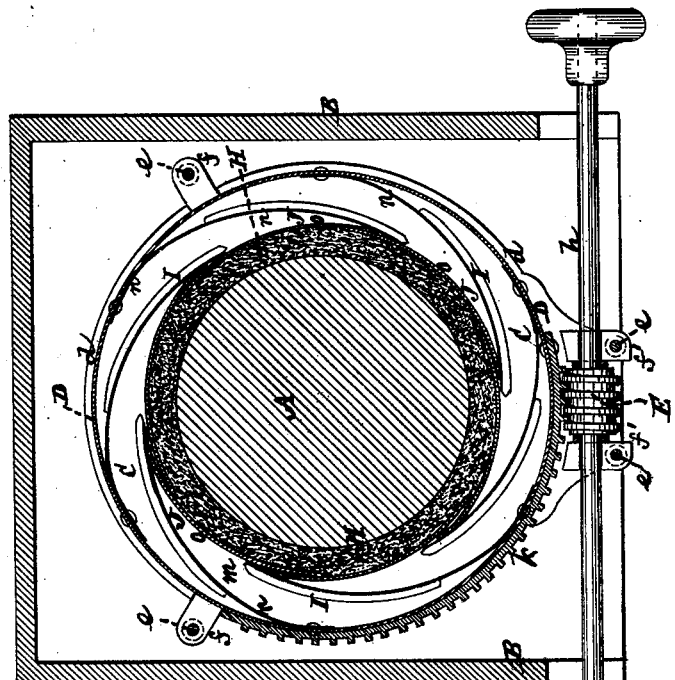
Witnesses
Fred Haynes
L. Allen
Inventor.
Adolpho Onslow
by his Attorneys
Brown & Allen

UNITED STATES PATENT OFFICE.

ADOLPHE ONSLOW, OF JERSEY CITY, NEW JERSEY.

IMPROVEMENT IN CAR-AXLE BOXES.

Specification forming part of Letters Patent No. 206,603, dated July 30, 1878; application filed June 19, 1878.

*To all whom it may concern:*

Be it known that I, ADOLPHE ONSLOW, of Jersey City, in the county of Hudson and State of New Jersey, have invented certain new and useful Improvements in Axle-Box Packings, of which the following is a description, reference being had to the accompanying drawing, which forms part of this specification.

This invention relates to the packing devices of boxes for railroad-car axles; and consists in a packing-ring and accompanying parts of novel character and construction, whereby every facility is afforded for adjustment of the packing from time to time to prevent the leakage or escape of oil from the box, and for self-adjustment of the packing against wear of the axle, in a very simple manner and without removal of the axle or its packing devices.

In the accompanying drawing, Figure 1 represents a longitudinal section through a railroad-car box, in part, having my invention applied; and Fig. 2 is a transverse section of the same.

A is the axle, and B the inner cheek or side of the box containing the packing devices which prevent leakage or escape of oil from the hollow body or lubricating-chamber B' of the box, within which the journal b of the axle works. Said inner cheek or side B is not only made with a lateral opening, c, through it for entry of the axle within it, but is of a hollow construction, and open at its bottom, to provide for the entry, withdrawal, and automatic adjustment against wear of the axle of the packing devices.

The packing devices consist in part of a metallic divided annular case composed of two parallel sections or halves, C C, each formed with an internal rim, d, on its outer edge, to receive within it a circularly-adjustable ring or band, D. The halves or sections C C of the annular case are united to hold the band D within them, with provision for the movement of said sections toward or from each other by means of screws e arranged to screw into projections f on the one of said sections, and having a loose or free fit in corresponding projections on the other of said sections. Said sections are also provided at the lower portions of their outer peripheries with ears or projections f', which form bearings for a spindle, h, having on it an endless screw, E, that gears with a circular rack or toothed sector, k, on the outside of the band D, for the purpose of rotating or adjusting the latter in a circular direction.

The annular case sections C C, holding the band D in between them, are entered up within the hollow cheek B of the axle-box, and the whole, together with accompanying devices hereinafter described, is capable of automatic adjustment up or down to conform to wear of the axle. One of said sections C has anti-friction projections l on its outer face to facilitate the movement of the annular case with its attachments within the cheek B, and the other of said sections C is grooved on its outer face to give a firm hold or bite for or to a packing-ring or facing, G, of leather or other suitable flexible material, which serves to prevent escape of oil from the chamber B' past the axle and down the inner side of the cheek B of the box.

The inner sides or faces m of both the annular case-sections C C are made conical or tapering, converging inwardly toward the axle, and serve to hold in between them a circular gasket or flexible packing, H, which bears against the axle to prevent the escape of oil from the box lengthwise of the axle. Said inner sides or faces of the annular case-sections C C are also formed with sectional spiral or convolute ribs I, arranged around the circular opening through the sections and consecutively lapping or extending partially one beyond the other. These sectional convolute ribs I form guides for flexible segmental pressers J, attached at their one end to the band D, and arranged to hug the gasket H and to overlap one another at their opposite or free ends. Said pressers are here represented as of an elastic construction, being formed of springs n and pressing-wings o, attached to the free ends of the springs, which are fast at their opposite ends to the band D. The pressing-wings o may be reduced in width between their opposite ends to facilitate their entry within the ribs I.

The annular case C C, with its circularly-adjustable band D and their attachments, as described, constitutes the entire packing-ring of the box.

When necessary to tighten up the packing it is only requisite to turn the screw E in a suitable direction by a knob or key fitted to its spindle, and by means of the rack k to circularly adjust the band D so that its attached segmental pressers J will be forced or wedged by the ribs I against the interior of the gasket H, and cause the latter to hug more closely said gasket and press it up against the axle. Such adjustment also, by the conical configuration of the inner sides or faces of the annular case-sections C C and movable connection of said sections toward or from each other, serves to compress or tighten the flexible packing-ring or facing G of the packing devices.

I claim—

1. The annular case C C, provided with segmental or sectional convolute ribs on its interior, in combination with the circularly-adjustable band D, having attached flexible segmental pressers for operation upon a circular gasket, which surrounds the axle, substantially as specified.

2. The combination of the screw E with the circularly-adjustable band D, having a toothed sector or rack, k, the annular case C C, the sectional convolute ribs I, and the flexible segmental pressers J, essentially as described.

3. The annular case C C, constructed of independent sections or halves, connected together to admit of their adjustment apart, and of a conical construction on their inner sides or faces m, in combination with the flexible packing-ring or washer G, the circular gasket H, and devices for compressing said gasket between the conical sides of the annular case-sections C C, substantially as specified.

4. In combination with the hollow inner check of the axle-box, a packing-ring loosely inserted therein, and composed of a circular band having attached flexible pressers, an annular case having sectional convolute guides for the direction of said pressers, and one or more flexible packings made capable of being tightened by the adjustment of the band, essentially as described.

ADOLPHE ONSLOW.

Witnesses:
ALFRED BURHORN,
HENRY T. BROWN.